(12) United States Patent
Sugino et al.

(10) Patent No.: US 7,087,334 B2
(45) Date of Patent: Aug. 8, 2006

(54) FUEL CELL OPERATION METHOD

(75) Inventors: Takuya Sugino, Hiki-gun (JP); Jun Suzuki, Saitama (JP); Nobutaka Nakajima, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 300 days.

(21) Appl. No.: 10/187,933

(22) Filed: Jul. 2, 2002

(65) Prior Publication Data
US 2003/0008185 A1    Jan. 9, 2003

(30) Foreign Application Priority Data
Jul. 4, 2001    (JP) .............. P2001-203939

(51) Int. Cl.
*H01M 8/04* (2006.01)
(52) U.S. Cl. .............. 429/25; 429/22; 429/13
(58) Field of Classification Search ........... 429/25, 429/13

See application file for complete search history.

(56) References Cited

U.S. PATENT DOCUMENTS

| 3,748,180 A * | 7/1973 | Clausi ................. 429/25 |
| 6,280,869 B1 * | 8/2001 | Chen .................. 439/34 |
| 2003/0022037 A1 * | 1/2003 | Parr et al. ............. 429/22 |

* cited by examiner

*Primary Examiner*—Patrick Joseph Ryan
*Assistant Examiner*—Ben Lewis
(74) *Attorney, Agent, or Firm*—Lahive & Cockfield LLP; Anthony A. Laurentano, Esq.

(57) ABSTRACT

The present invention relates to a fuel cell operation method in which a fuel cell 11 that generates power using hydrogen gas and oxidant gas as reaction gas is operated at an operating pressure that corresponds to a required power generation state. A hydrogen sensor 54 that detects hydrogen density is provided in a vicinity of the fuel cell 11, and based on values detected by the hydrogen sensor 54 and on the amount of hydrogen leakage at the current operating pressure and on the characteristics of the fuel cell 11, an operating pressure is predicted at which the hydrogen leakage amount from the fuel cell will not exceed a predetermined value, and the fuel cell 11 is operated while limiting the operating pressure to below the predicted operating pressure.

8 Claims, 7 Drawing Sheets

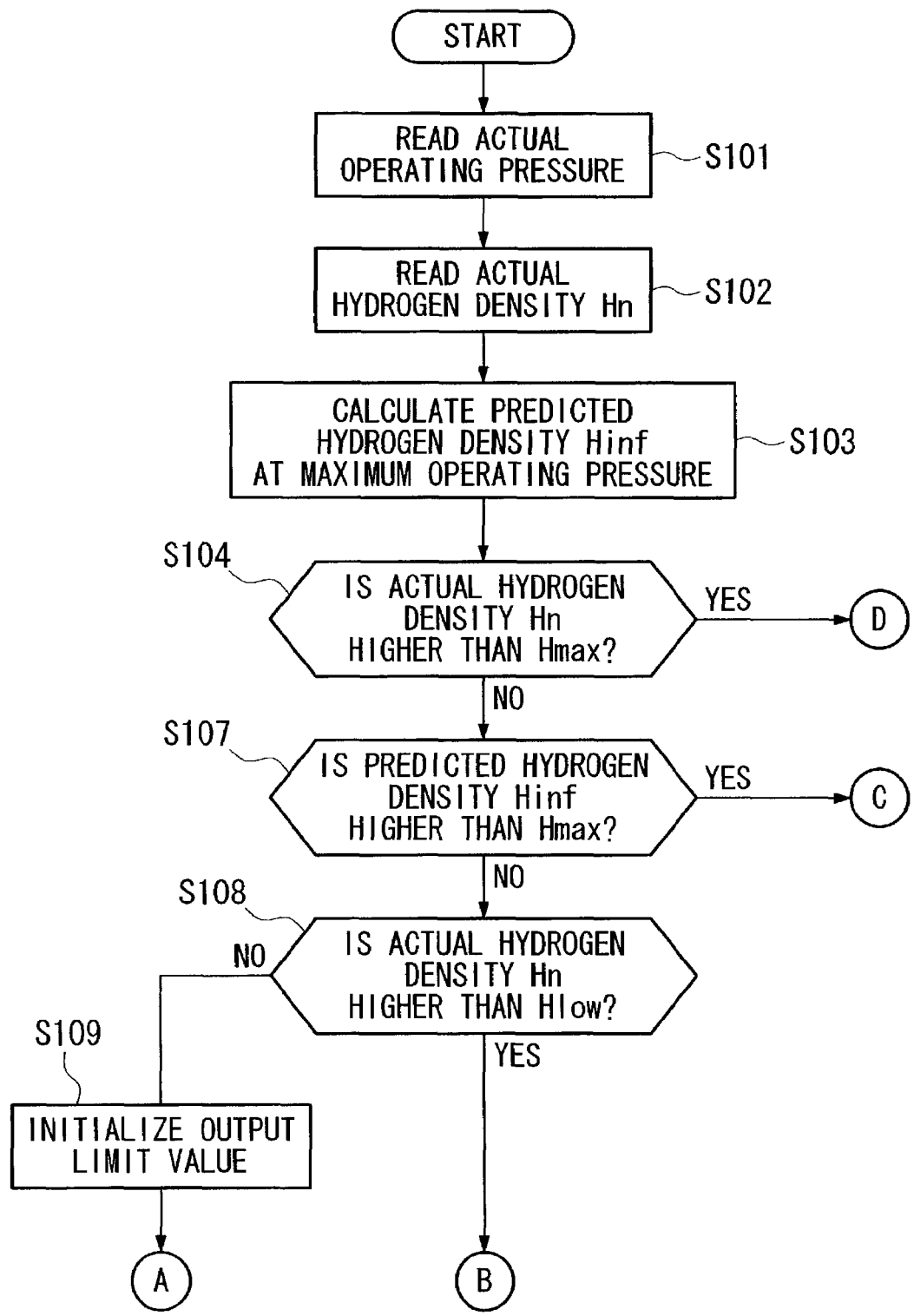

FUEL CELL OPERATION METHOD

BACKGROUND OF THE INVENTION

1. Field of the Invention

The present invention relates to an operation method for a fuel cell that generates electricity using hydrogen gas and oxidant gas as reaction gases, and, in particular, to an operation method for a fuel cell that has excellent safety control against hydrogen leakages.

2. Description of the Related Art

One type of fuel cell that is mounted in a fuel cell vehicle or the like is formed as a stack in which a plurality of cells, each formed by interposing between an anode and a cathode a solid polymer electrolytic membrane (formed, for example, from a solid polymer ion exchange membrane or the like) such that the solid polymer electrolytic membrane is sandwiched on both sides by the anode and cathode, are arranged in layers. This fuel cell is provided with a hydrogen pole to which hydrogen gas is supplied as fuel gas, and an air pole to which air containing oxygen is supplied as an oxidant gas. In this fuel cell hydrogen ions generated by a catalytic reaction at the anode move to the cathode by passing through the solid polymer electrolytic membrane, and subsequently cause an electrochemical reaction with oxygen at the cathode so as to generate electricity.

Because hydrogen gas is an inflammable gas it is necessary to take sufficient care that it does not leak into the atmosphere. Generally, in locations where hydrogen gas is handled, for safety control the hydrogen density is monitored and the necessary steps are taken in accordance with the size of the detected hydrogen density, and fuel cells that use hydrogen gas as fuel are not exceptional. However, because hydrogen is a highly permeating substance it is extremely difficult to seal it in completely. In particular, because the above described solid polymer electrolytic membrane type of fuel cell has a stack structure it is difficult to completely block the hydrogen from leaking out from the fuel cell. Moreover, it is difficult to prevent hydrogen leakages from joint portions such as where connections are formed in the hydrogen piping.

Therefore, conventionally, a hydrogen sensor that detects the hydrogen density is installed in the vicinity of the fuel cell. When the hydrogen sensor detects a hydrogen density above a predetermined level a warning is issued and the operation of the fuel cell is halted.

Moreover, as is disclosed in Japanese Patent Application Laid-Open (JP-A) No. 8-31436, there is also a fuel cell that is housed inside a ventilated box. The hydrogen density inside the box is constantly monitored by installing a hydrogen sensor that detects the hydrogen density inside the box. When the hydrogen density detected by the hydrogen sensor exceeds a predetermined level a ventilation fan is operated and ventilation is forcibly performed, thereby reducing the hydrogen density inside the box.

However, in a system such as the conventional one in which a warning is issued and the system halted when a predetermined hydrogen density is detected by the hydrogen sensor there are times when the system is suddenly halted without any prior warning. In the case of a fuel cell vehicle, if the operation of the fuel cell is suddenly halted like this the problem arises that the vehicle cannot be moved to a location where repairs can be made.

Moreover, as is disclosed in Japanese Patent Application Laid-Open (JP-A) No. 8-31436, in a system in which a ventilation fan is operated and the interior of the box is forcibly ventilated when a predetermined hydrogen density is detected by the hydrogen sensor, because the amount of hydrogen leakage is not suppressed the fear arises that the amount of hydrogen leakage will subsequently continue to increase.

DISCLOSURE OF THE INVENTION

Therefore, the present invention provides a fuel cell operation method that makes use of the feature that the amount of hydrogen leakage from a fuel cell has a correlation with the operating pressure of the fuel cell (namely, with the reaction gas supply pressure) so that the higher the operating pressure the greater the amount of hydrogen leakage, and that limits the operating pressure such that the amount of hydrogen leakage from the fuel cell does not exceed a predetermined value.

In order to solve the above problems, one embodiment of the present invention is a fuel cell operation method in which a fuel cell (for example, the fuel cell 11 in the embodiment described below) that generates power using hydrogen gas and oxidant gas as reaction gas is operated at an operating pressure that corresponds to a required power generation state, wherein a hydrogen sensor (for example, the hydrogen sensor 54 in the embodiment described below) that detects hydrogen density is provided in a vicinity of the fuel cell and a hydrogen flow passage, and based on values detected by the hydrogen sensor, the operating pressure (for example, the air supply pressure in the embodiment described below) is limited such that a hydrogen leakage amount from the fuel cell and hydrogen flow passage does not exceed a predetermined value (for example, the permissible hydrogen leakage amount Hlim in the embodiment described below).

When the ventilation amount in the vicinity of a fuel cell is constant, a correlation exists between the amount of hydrogen leaking from the fuel cell and the hydrogen density in the vicinity of the fuel cell. Accordingly, it is possible to estimate the hydrogen leakage amount from the fuel cell based on values detected by a hydrogen sensor. Moreover, the characteristic exists that the hydrogen leakage amount from the fuel cell depends on the operating pressure of the fuel cell (namely, the supply pressure at which reaction gas is supplied), and the higher the operating pressure the greater the hydrogen leakage amount. Accordingly, it is possible to control the operation of the fuel cell by limiting the operating pressure such that the hydrogen leakage amount from the fuel cell does not exceed a predetermined value based on values detected by the hydrogen sensor.

In another aspect of the present invention, in the above described aspect, based on characteristics of the fuel cell and the hydrogen leakage amount at a current operating pressure, an operating pressure (for example, the permissible operating pressure Plim in the embodiment described below) at which the hydrogen leakage amount will not exceed the predetermined value is predicted, and the operating pressure is limited to less than the predicted operating pressure.

Because a correlation exists between the amount of hydrogen leaking from the fuel cell and the hydrogen density in the vicinity of the fuel cell when the ventilation amount in the vicinity of a fuel cell is constant, and the amount of the hydrogen leakage from the fuel cell depends on the operating pressure of the fuel cell (namely, on the supply pressure at which reaction gas is supplied), it is possible to predict an operating pressure at which the hydrogen leakage amount is less than the predetermined value from the current operating pressure of the fuel cell and the current hydrogen density detected by the hydrogen sensor, and it is possible to control the operation of the fuel cell by limiting the operating pressure to below the relevant operating pressure. Note that, in each of the above aspects of the present invention, it is possible to provide a hydrogen sensor for detecting hydrogen density not only in the vicinity of the fuel cell, but also on the hydrogen flow path.

BRIEF DESCRIPTION OF THE DRAWINGS

FIGS. 6A and 6B are an example of an operation control flow chart for a fuel cell.

DESCRIPTION OF THE PREFERRED EMBODIMENTS

An embodiment of the fuel cell operation method of the present invention will now be described with reference to FIGS. 1 to 7. Note that the embodiment in this case is applied to a fuel cell mounted in a fuel cell vehicle.

Figure 1:
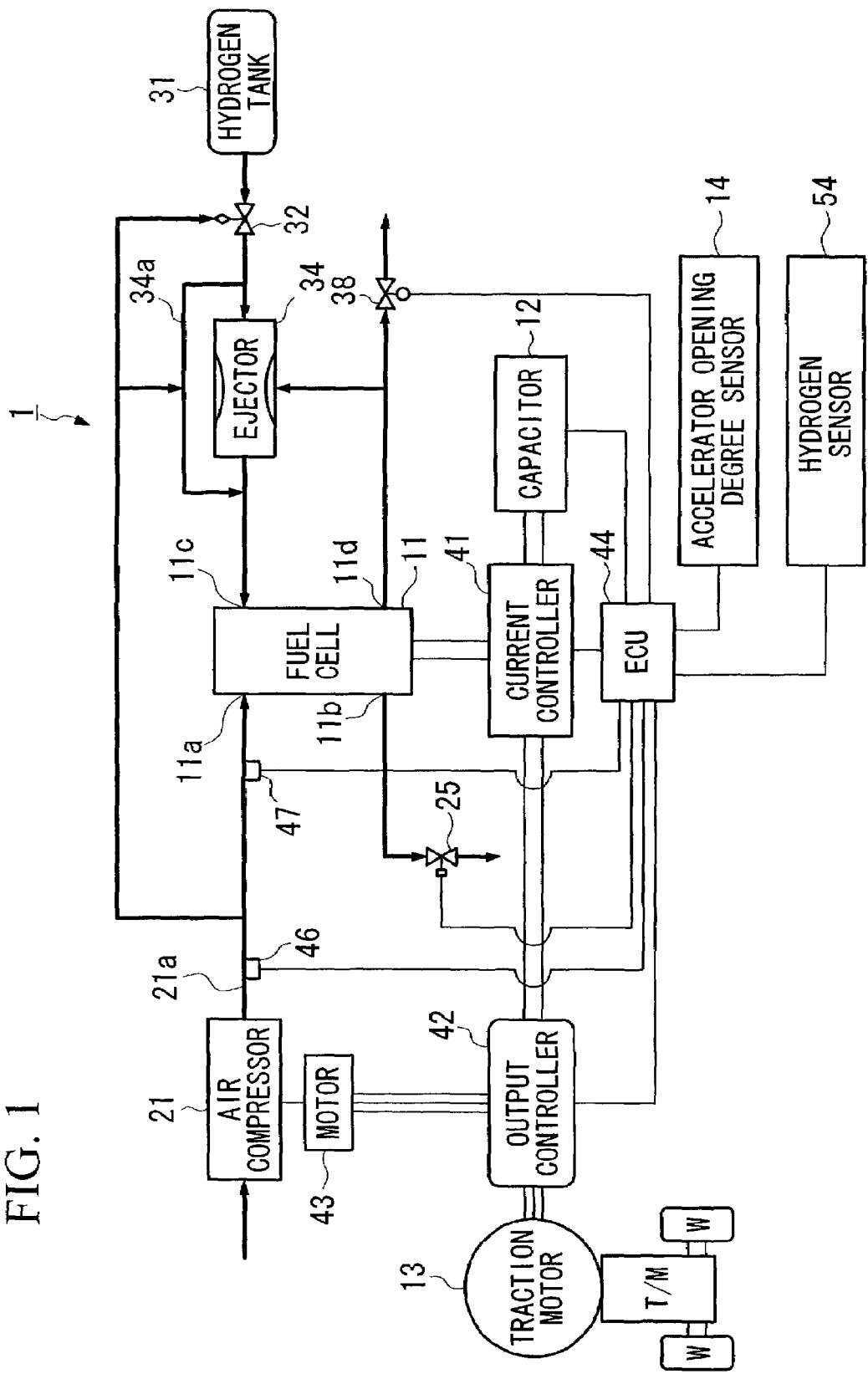
FIG. 1 is a schematic structural view of a fuel cell vehicle according to an embodiment of the present invention.

FIG. 1 is a schematic structural view of a fuel cell vehicle.

The fuel cell vehicle 1 is provided with a hybrid type of power unit formed by a fuel cell 11 and a storage apparatus, for example, the capacitor 12. The drive force of a traction motor 13 to which power is supplied from this power unit is transmitted to driving wheels W via a transmission T/M formed either by an automatic transmission or a manual transmission.

When drive force is transmitted from the driving wheel W side to the traction motor 13 side as the vehicle is decelerating, the traction motor 13 functions as a power generator to generate what is known as regenerative braking force, and thereby recover the kinetic energy of the vehicle as electrical energy.

The fuel cell 11 is formed as a stack in which a plurality of cells, each formed by interposing between an anode and a cathode a solid polymer electrolytic membrane (formed, for example, from a solid polymer ion exchange membrane or the like) such that the solid polymer electrolytic membrane is sandwiched on both sides by the anode and cathode, are arranged in layers. This fuel cell is provided with a hydrogen pole to which hydrogen gas is supplied as fuel gas, and an air pole to which air containing oxygen is supplied as an oxidant gas. Hydrogen ions generated by a catalytic reaction at the anode move to the cathode by passing through the solid polymer electrolytic membrane, and subsequently cause an electrochemical reaction with oxygen at the cathode so as to generate electricity.

The air pole of the fuel cell 11 is provided with an air supply aperture 11a through which air is supplied from an air compressor 21, which forms an oxidant supply section, and an air discharge aperture 11b through which air and the like inside the air pole is discharged to the outside. The hydrogen pole is provided with a hydrogen supply aperture 11c through which hydrogen gas is supplied from a hydrogen tank 31 forming a fuel supply section, and a hydrogen discharge aperture 11d through which hydrogen gas and the like inside the hydrogen pole is discharged to the outside.

The air compressor 21 takes in air; for example, from outside the vehicle, performs adiabatic compression on this air, and supplies it to the air pole side of the fuel cell 11 as reaction gas. In addition, it also supplies the air as a pressure signal to a fuel supply control valve 32 (described below) and to an ejector bypass control valve 35.

The air that has been compressed and heated by the air compressor 21 is able to be supplied to a cooler 22, and in accordance with the operating state of the fuel cell 11, for example, air that has been cooled by the cooler 22 to a predetermined temperature may be supplied to a cathode humidifier 24, the fuel supply control valve 32, and the ejector bypass control valve 35.

A cooler bypass flow passage 22a that bypasses the cooler 22 and a cooler bypass control valve 23 provided, for example, on the downstream side of the cooler 22 is provided on a flow passage that connects the air compressor 21 to the cathode humidifier 24, the fuel supply control valve 32, and the ejector bypass control valve 35.

Namely, by closing the cooler bypass control valve 23 in accordance with the operating state of the fuel cell 11, it is possible to supply air that has been compressed and heated by the air compressor 21 to the fuel cell 11, the fuel supply control valve 32, and the ejector bypass control valve 35 without this air being cooled.

The cathode humidifier 24 is provided with a water permeable membrane such as, for example, a hollow fiber membrane, and discharged air that is discharged from the air discharge aperture 11b of the fuel cell 11 is used as humidifying gas for the air that is supplied as reaction gas. Namely, if air is made to contact the discharged air via the water permeable membrane, then moisture (in particular, water vapor) contained in the discharged air is supplied to the air as water vapor after permeating through the membrane holes in the water permeable membrane.

The humidified air is then supplied to the fuel cell 11 so that the ion conductivity of the solid polymer electrolytic membrane of the fuel cell 11 is kept in a predetermined state.

Note that, as has been described below, discharged air that has been discharged from the air discharge aperture 11b of the fuel cell 11 is supplied in sequence to an anode humidifier 36 and the cathode humidifier 24 as humidifying gas, while discharged air discharged from the cathode humidifier 24 is discharged outside the vehicle via a back pressure control valve 25.

The opening and closing operation of the back pressure control valve 25 is controlled by an ECU 44 in accordance with the operating state of the fuel cell 11. By setting the back pressure control valve 25 to a valve opening degree that conforms to a control signal input from the ECU 44, the pressure of the air (air supply pressure) supplied as reaction gas to the inside of the fuel cell 11 is controlled so as to be at a predetermined pressure. Note that the air supply pressure is controlled so as to increase as the generated current from the fuel cell 11 increases.

Hydrogen gas serving as fuel for the fuel cell 11 is supplied to the fuel supply control valve 32 from, for example, a high-pressure hydrogen tank 31.

The fuel supply control valve 32 is, for example, a pneumatic type of proportional pressure control valve, and taking the pressure of the air supplied from the air compressor 21 as a signal pressure, the pressure at the point of exit from the fuel supply control valve 32 of the hydrogen gas passing through the fuel supply control valve 32 is controlled so as to be within a predetermined range that corresponds to the signal pressure.

Hydrogen gas that has passed through the fuel supply control valve 32 is supplied to a heat exchanger 33. In this heat exchanger 33, hydrogen gas that has been set to a predetermined temperature in accordance with the operating state of the fuel cell 11 by, for example, a heat exchange reaction with a cooling material or the like is supplied to the hydrogen pole of the fuel cell 11 from the hydrogen supply aperture 11c via, in this sequence, either an ejector 34 or the ejector bypass control valve 35, and the anode humidifier 36.

Further, unreacted discharged gas that has been discharged from the hydrogen discharge aperture 11d of the fuel cell 11 is introduced into the ejector 34 via a storage tank 37 and hydrogen gas supplied from the heat exchanger 33 is mixed together with discharged gas discharged from the fuel cell 11 and the resultant gas is again supplied to the fuel cell 11.

The ejector 34 suctions in discharged gas from the fuel cell 11 forming a sub-flow using negative pressure generated in the vicinity of the high-speed hydrogen gas flow flowing through the interior of the ejector 34. This discharged gas is then mixed with hydrogen gas supplied via the heat exchanger 33 and the resultant gas is again supplied to the fuel cell 11. As a result, discharged gas discharged from the fuel cell 11 is recirculated.

In addition, an ejector bypass flow passage 34a that bypasses the ejector 34 is provided in the flow passage connecting the heat exchanger 33 with the anode humidifier 36.

Here, an ejector bypass control valve 35 formed, for example, as a pneumatic type of proportional pressure control valve is provided parallel to the ejector 34 on the ejector bypass flow passage 34a. Taking the pressure of air supplied from the air compressor 21 as signal pressure, the pressure at the point of exit from the ejector bypass control valve 35 of the hydrogen gas passing through the ejector bypass control valve 35 namely, the hydrogen supply pressure is controlled so as to be within a predetermined range that corresponds to the signal pressure.

Namely, taking the pressure of the air serving as oxidant gas as a reference pressure, control of the pressure flow by the fuel supply control valve 32 and the ejector bypass control valve 35 is performed such that the pressure flow amount characteristics 11) is controlled in accordance with the operating state of the fuel cell 11, and this of hydrogen gas passing through the ejector 34 are in a predetermined state. Moreover, the difference between the pressure of the fuel (i.e., the hydrogen supply pressure) and the pressure of the oxidant (i.e., the air supply pressure) on the solid polymer electrolytic membrane of the fuel cell 11, namely, the differential pressure between the fuel pole and the air pole is controlled so as to be within a predetermined pressure difference range.

Namely, the air supply pressure and the hydrogen supply pressure of the air and hydrogen supplied to the fuel cell 11 (namely, the operating pressure of the fuel cell 11) is controlled in accordance with the operating state of the fuel cell 11, and this control is performed such that the operating pressure of the fuel cell 11 increases as the generated current of the fuel cell 11 increases.

The anode humidifier 36 is provided with a water permeable membrane such as, for example, a hollow fiber membrane, and discharged air that is discharged from the air discharge aperture 11b of the fuel cell 11 is used as humidifying gas for the hydrogen gas. Namely, if hydrogen is made to contact the discharged air via the water permeable membrane, then moisture (in particular, water vapor) contained in the discharged air is supplied to the hydrogen gas as water vapor after permeating through the membrane holes in the water permeable membrane.

The humidified hydrogen gas is then supplied to the fuel cell 11 so that the ion conductivity of the solid polymer electrolytic membrane of the fuel cell 11 is kept in a predetermined state.

The storage tank 37, separates the discharged gas that has been discharged from the hydrogen discharge aperture 11b of the fuel cell 11 into gas and liquid, and separates out and stores the moisture in a liquid state contained in the discharged gas.

The opening and closing operations of a discharge control valve 38 are controlled by the ECU 44 in accordance with the operating state of the fuel cell 11, and, for example, excess moisture (mainly liquid water) in the discharged gas separated out in the storage tank 37 is discharged to the outside of the vehicle.

Generated current output from the fuel cell 11 is input into a current controller 41. The capacitor 12 formed, for example, by an electrical double layer condenser or electrolytic condenser serving as a storage device is connected to the current controller 41.

Moreover, the fuel cell 11 and the capacitor 12 are connected in parallel via the current controller 41 and an output controller 42 to the traction motor 13 (i.e., an electrical load), a motor 43 that drives the air compressor 21, and the like.

The current controller 41 is provided with, for example, a DC-DC chopper or the like and, as is described below, based on a target generated current IFC output from the ECU 44, namely, on a generation command to the fuel cell 11, the current controller 41 controls the current value of generated current output from the fuel cell 11.

The output controller 42 is provided respectively with PWM converters for the traction motor and the air compressor motor formed, for example, by switching elements such as IGBT or the like. As is described below, based on torque commands to the traction motor 13 and rotation speed commands to the air compressor 21 and the like output from the ECU 44, the current power output from the fuel cell 11 and capacitor 12 via the current controller 41 is converted into three-phase alternating current power, and is then supplied to the traction motor 13 and the motor 43 that drives the air compressor 21.

Note that the traction motor 13 and the motor 43 are formed, for example, by permanent magnet type three-phase alternating current synchronous motors that use permanent magnets for the magnetic field, and are controlled so as to be driven by three-phase alternating current power supplied from the output controller 42.

The ECU 44 calculates the remaining capacity of the capacitor 12 based, for example, on temperature, terminal voltage, and output current output from the capacitor 12 forming a storage device, and controls the power supply to the loads of the traction motor 13, motor 43, and the like.

Further, the ECU 44 controls the power conversion operations of the PWM inverters installed in the output controller 42. For example, the ECU 44 calculates the desired motor output from the traction motor 13 based on a signal of the accelerator opening degree AC relating to the amount the accelerator pedal is depressed by the driver and the like. By inputting this motor output command to the output controller 42 a pulse width modulation signal that corresponds to the motor output command is input into the PWM inverter for the traction motor, and the respective phase current for generating the desired motor output is output to the respective phase of the traction motor 13.

The ECU 44 also calculates the electrical load of the various auxiliary equipment needed to operate the fuel cell 11 and, based on this electrical load and the motor output required from the traction motor 13, calculates a target generated current IFC for the generated current to be output from the fuel cell 11 into the current controller 41, and inputs this into the current controller 41.

Furthermore, based on the target generated current, the ECU 44 calculates, for example, a rotation speed N for the air compressor 21 as a required value for the flow amount of the reaction gas, and also calculates, for example, a valve opening degree θ for the back pressure control valve 25 as a required value for the pressure of the reaction gas. As a result of this rotation speed N then being input into the output controller 42, the respective phase current that corresponds to the rotation speed N is output to the respective phase of the motor 43. Moreover, as a result of the calculated valve opening degree θ being input into the back pressure control valve 25, the valve opening degree of the back pressure control valve 25 is controlled.

Feedback control of the valve opening degree θ of the back pressure control valve 25 and the revolution speed N of the air compressor 21 is also performed such that the respective deviations between the respective required values for the flow amount and pressure of the reaction gas and the flow amount and pressure of the reaction gas that is actually supplied to the fuel cell 11 are zero.

As a result, the following signals are input into the ECU 44. Namely, detection signals of the accelerator opening degree AC relating, for example, to the amount the accelerator pedal is depressed by the driver that are output from an accelerator opening degree sensor 14; signals of flow amount detection values QN that are output from a gas amount sensor 46 that detects, for example, the flow amount of air (i.e., the mass flow amount) supplied from the air compressor 21; and signals of pressure detection values PN that are output from a pressure sensor 47 that detects, for example, the pressure of air supplied to the air pole side of the fuel cell 11.

Note that the gas amount sensor 46 is provided in the vicinity of an air discharge aperture 21a of the air compressor 21, while the pressure sensor 47 is provided in the vicinity of the air supply aperture 11a of the fuel cell 11.

Figure 2:
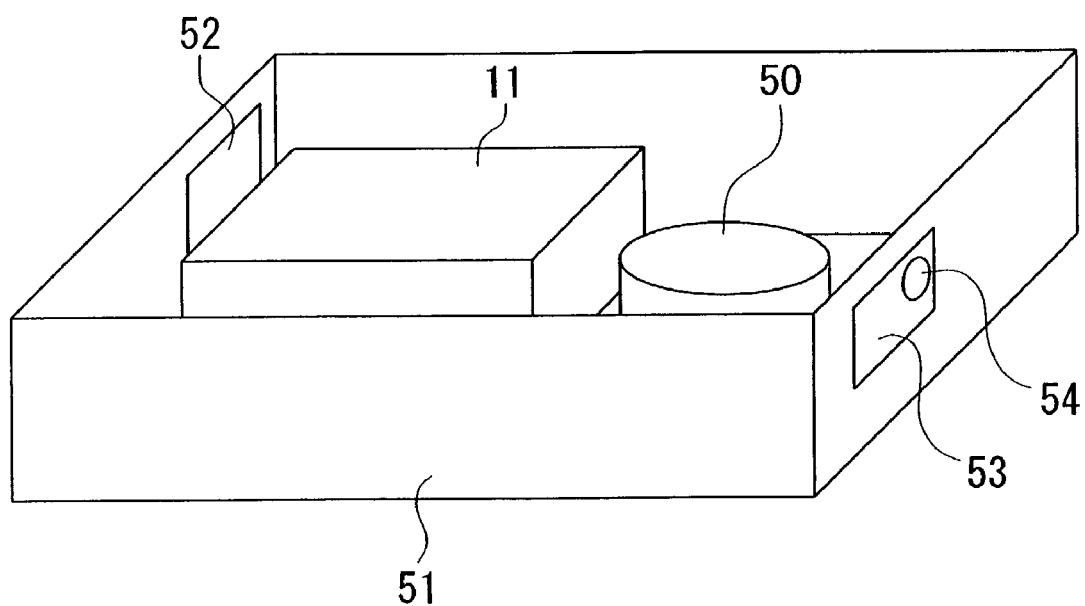
FIG. 2 is a perspective view of an FC box in the above embodiment.

Moveover, as is shown in FIG. 2, in the fuel cell vehicle 1, fuel cell and a hydrogen supply system device group 50 are housed inside a sealed box (referred to below as the FC box) 51. Here, the hydogen supply system device group 50 includes the fuel supply control valve 32, the heat converter, the ejecter 34, the ejecter bypass control vavle 35, the anode humidifier 36, and the tubing and the like used to connect all of these.

The FC box 51 is provided in order to control hydrogen leakages from the fuel cell 11. Therefore, the FC box 51 has a ventilation intake aperture 52 and a ventilation outlet aperture 53 so that ventilation can be performed at a constant flow amount. In addition, a hydrogen sensor 54 that detects the hydrogen density is provided in the vicinity of the ventilation outlet aperture 53. Hydrogen density detection value signals output from the hydrogen sensor 54 are input into the ECU 44. Note that the position where the hydrogen sensor 54 is installed is not limited to the vicinity of the ventilation outlet aperture 53, and the hydrogen sensor 54 may also be installed at any position inside the FC box 51 where it is thought that there may be a leaking hydrogen gas flow. For example, it is also possible for the hydrogen sensor 54 to be installed near the fuel cell 11. It is also preferable that the FC box 51 has a small capacity as this increases the accuracy of the detection of hydrogen leakages.

Next, the operating control principle of the fuel cell 11 with regard to hydrogen leakage control in the fuel cell vehicle 1 will be described.

As is described above, in a solid polymer electrolytic membrane type of fuel cell 11 that uses hydrogen gas as a fuel, because hydrogen has a high degree of permeability and because of the stacked structure of the fuel cell 11, there are cases in which hydrogen supplied to the fuel cell 11 permeates the structural members of the fuel cell 11 (for example, the solid polymer electrolytic membrane and the separators positioned on both sides thereof and the like) and leaks into the FC box 51. This is because in a solid polymer electrolytic membrane type of fuel cell 11, even if the fuel cell 11 is brand new with absolutely no defects, there are still cases when an extremely minute amount of leaking hydrogen is observed.

Accordingly, even if a brand new fuel cell 11 with no defects is used, if the interior of the FC box 51 is not ventilated the hydrogen density inside the FC box 51 continually increases. Therefore, in the present embodiment ventilating air is introduced at a constant flow amount from the ventilation intake aperture 52 into the FC box 51 and is discharged from the ventilation outlet aperture 53.

Figure 3:
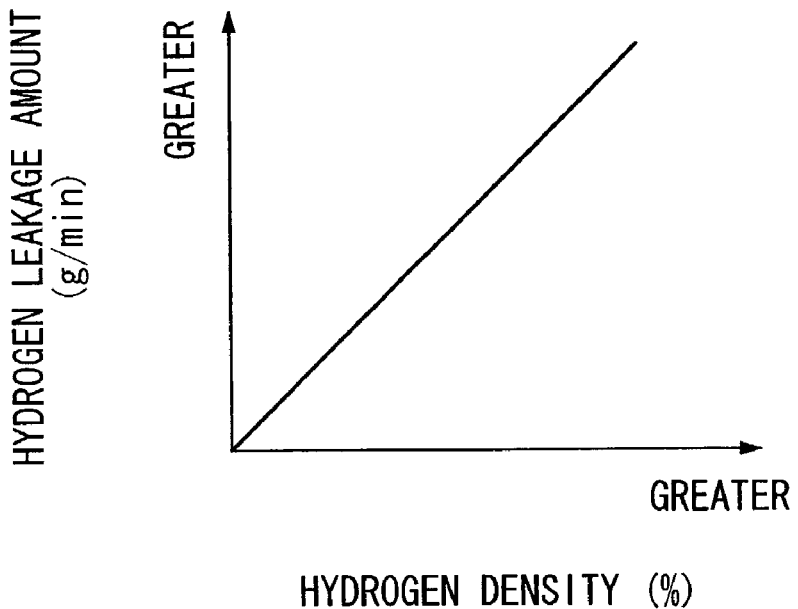
FIG. 3 is a view showing a relationship between an amount of hydrogen leakage and a hydrogen density.

When the FC box 51 is ventilated at a constant flow amount in this way the linear function type relationship shown in FIG. 3 is established between the amount of the hydrogen leakage from the fuel cell 11 and the hydrogen density inside the FC box 51. Accordingly, based on the hydrogen density inside the FC box 51 detected by the hydrogen sensor 54, the amount of the hydrogen leakage from the fuel cell 11 and the hydrogen system device group and tubing can be estimated.

Figure 4:
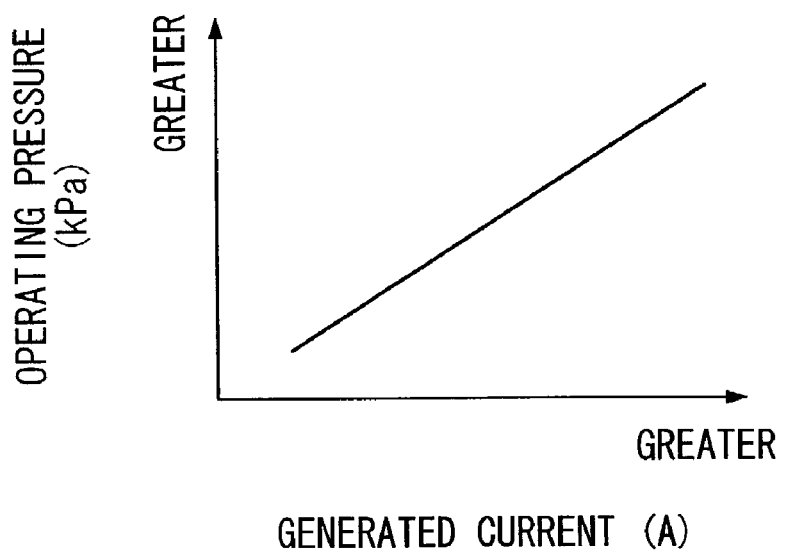
FIG. 4 is a view showing the relationship between the operating pressure of a fuel cell and a generated current.

In contrast, as is described above, the fuel cell 11 operates by changing the operating pressure in accordance with the required generation state (e.g., the required generated current corresponding to the accelerator opening degree) of the fuel cell 11. FIG. 4 shows an example of the relationship between the generated current and the operating pressure of the fuel cell 11. It can be seen that the operating pressure is controlled so as to increase as the generated current increases. In addition, a maximum operating pressure Pmax is set for the operating pressure and the operating pressure is controlled so as to be less than this maximum operating pressure Pmax.

Figure 5:
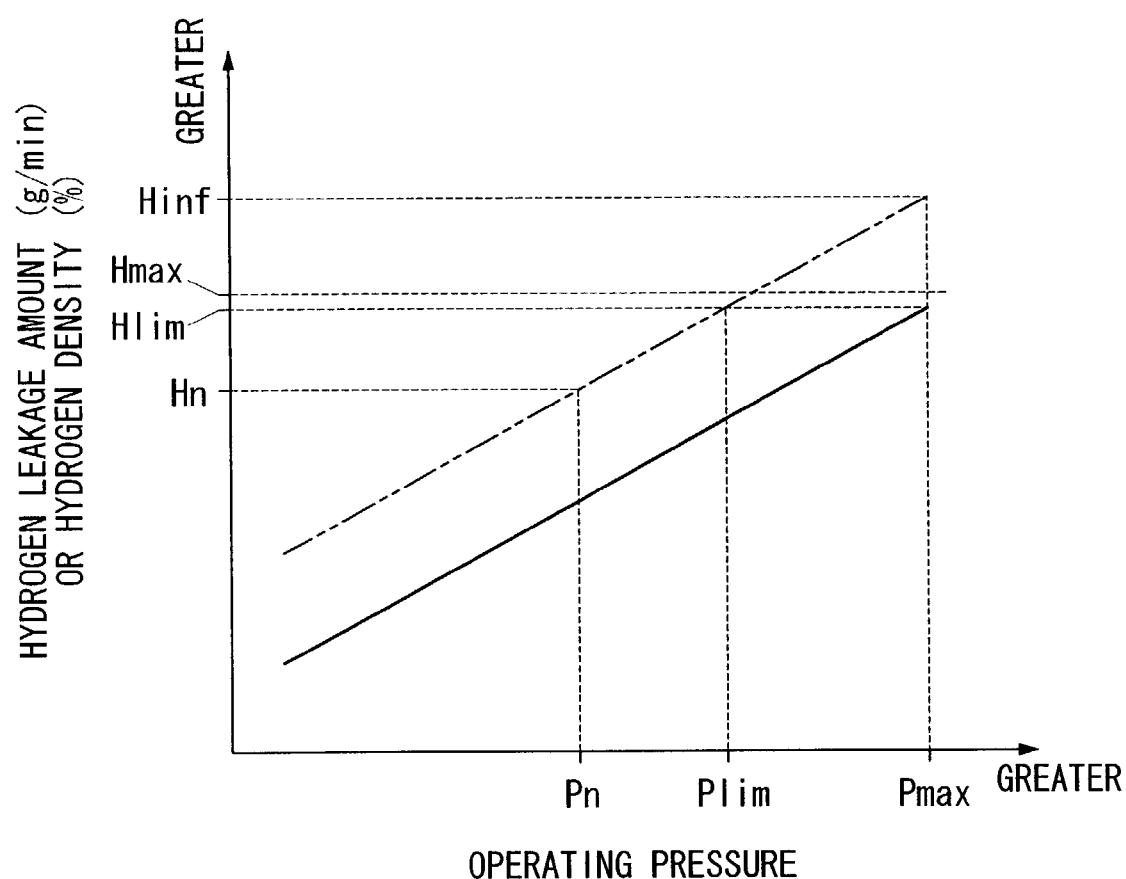
FIG. 5 is a view showing a relationship between an amount of hydrogen leakage from a fuel cell and the operating pressure of the fuel cell.

It has been learned through experience that the amount of hydrogen leakage from the fuel cell 11 and the hydrogen system devices and tubing depends on the operating pressure. FIG. 5 shows an example of the results of experiments to determine the relationship between the operating pressure of the fuel cell 11 and the amount of hydrogen leakage. The solid line in FIG. 5 shows the characteristic of the average hydrogen leakage from a brand new fuel cell 11 with no defects. Namely, in the case shown in FIG. 5, the greater the operating pressure, the more the hydrogen leakage amount increases in the manner of a linear function. Moreover, according to experiments, there are cases when the hydrogen leakage characteristic of a particular fuel cell does not match the average hydrogen leakage characteristic of a brand new fuel cell 11 in spite of the fuel cells having the same specifications. This is due to solid irregularities in the fuel cell 11 or to the particular fuel cell deteriorating over time. In such cases as well it has been determined that the ratio of an increase/decrease in the hydrogen leakage amount (in other words, the trend in the hydrogen leakage characteristic line shown in FIG. 5) relative to an increase/decrease in the operating pressure is the same.

Note that, to describe it more accurately, the amount of any hydrogen leakage from the fuel cell 11 depends on the pressure of the hydrogen supply to the fuel cell 11, however, as is described above, because in the fuel cell 11 the hydrogen supply pressure is controlled using the air supply pressure as a reference pressure, it can be said that the amount of the hydrogen leakage from the fuel cell 11 depends on the pressure of the air supply to the fuel cell 11. With no change in the operating pressure of the fuel cell 11 in either the hydrogen supply pressure or the air supply pressure, the amount of the hydrogen leakage from the fuel cell 11 depends on the operating pressure.

However, in the fuel cell 11 of the present embodiment, because the air supply amount and air supply pressure to the fuel cell 11 are used as parameters for controlling the generated current, and because the air supply amount is detected by the gas amount sensor 46 and the air supply pressure is detected by the pressure senor 47 in order to perform feedback control on these parameters, in the present embodiment, the air supply pressure is used as the operating pressure in the relationship with the hydrogen leakage amount.

Because of this, in fuel cells 11 that have the same specifications, if the current hydrogen density Hn inside the FC box 51 detected by the hydrogen sensor 54 and the current operating pressure Pn detected by the pressure sensor 47 are known, then based on the hydrogen leakage characteristic shown in FIG. 5, it is possible to predict the hydrogen leakage amount Hinf when the fuel cell 11 is operated at the maximum operating pressure Pmax. In addition, it is possible to predict the operating pressure Plim when a predetermined hydrogen leakage amount Hlim is reached. Here, the predetermined hydrogen leakage amount (referred to below as the permissible hydrogen leakage amount) Hlim is set to a value less than the maximum hydrogen leakage amount Hmax, and if control is performed so as to operate the fuel cell 11 below the operating pressure (referred to below as the permissible operating pressure) Plim corresponding to Hlim, it becomes possible to operate the fuel cell 11 while suppressing the hydrogen leakage amount from the fuel cell 11 to a level below the permissible hydrogen leakage amount Hlim.

Note that because the hydrogen leakage amount is estimated based on the hydrogen density detected by the hydrogen sensor 54, the hydrogen leakage amount on the vertical axis in the hydrogen leakage characteristic graph shown in FIG. 5 can be replaced with a hydrogen density corresponding to the hydrogen leakage amount. Therefore, in order to simplify the description given below, the vertical axis shown in FIG. 5 also shows the hydrogen density.

Moreover, because the generated current and the operating pressure have a relationship such as that shown in FIG. 4, it is possible to decide the generated current (referred to below as the permissible generated current) Ilim that corresponds to the permissible operating pressure Plim. Accordingly, instead of controlling the operation of the fuel cell 11 by limiting the operating pressure to below the permissible operating pressure Plim, it is also possible to control the operation of the fuel cell 11 by limiting the current output from the fuel cell 11 to below the permissible generated current Ilim.

Figure 6B:
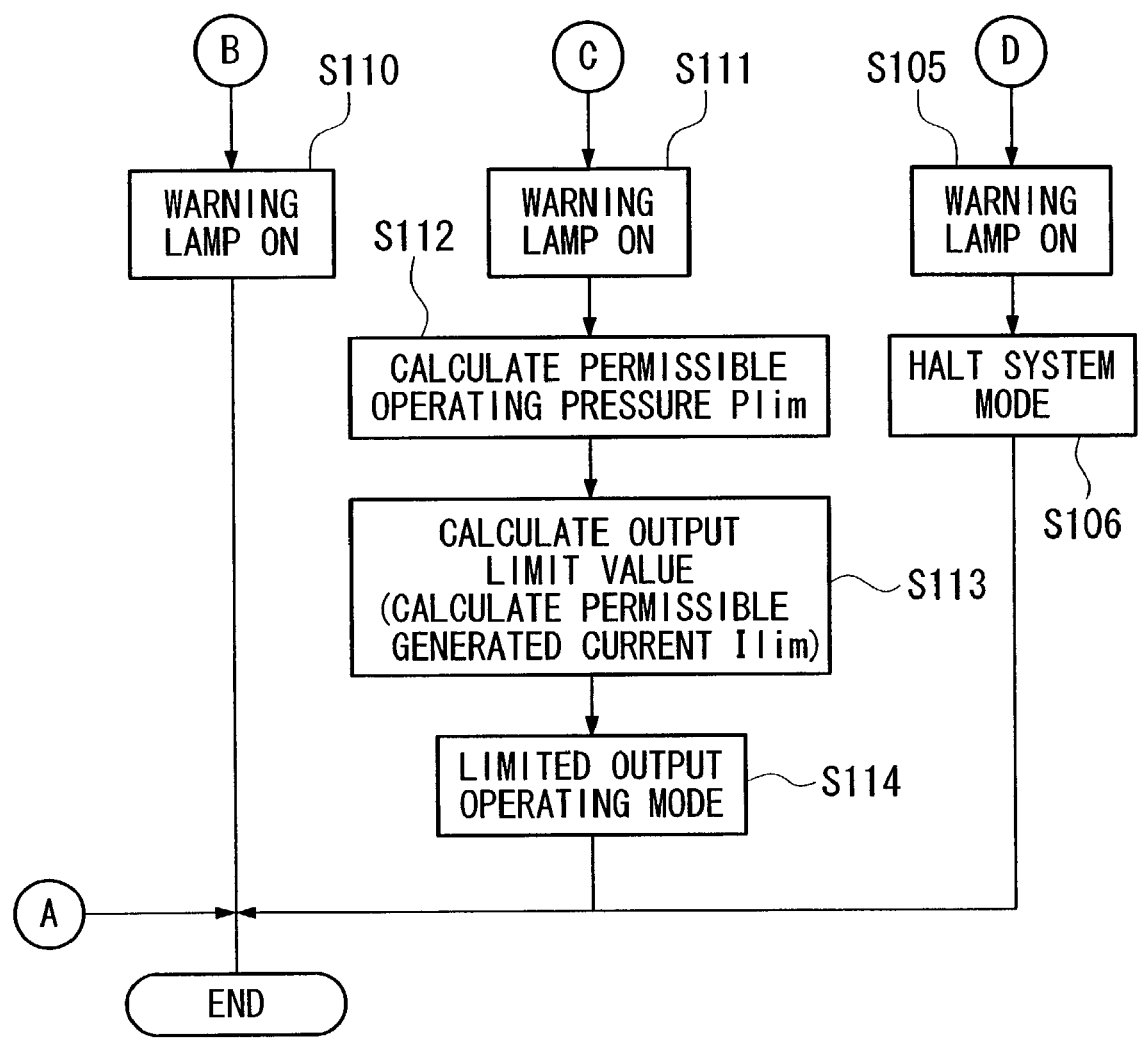

Next, the operation method of the fuel cell in the present embodiment will now be described with reference to the flow chart in FIGS. 6A and 6B.

Firstly, the current actual operating pressure Pn detected by the pressure sensor 47 is read (step S101), and the current actual hydrogen density Hn inside the FC box 51 detected by the hydrogen sensor 54 is read (step S102).

Next, based on the hydrogen leakage characteristic of this fuel cell 11 (see FIG. 5), the predicted hydrogen density Hinf inside the FC box 51 when the fuel cell 11 is operating at the maximum operating pressure Pmax is calculated by map reference or by a computer (step S103).

Next, it is determined whether or not the current actual hydrogen density Hn read in step S102 is higher than the maximum hydrogen density Hmax (for example 2%) (step S104).

If the result of the determination in step S104 is YES (i.e., if Hn>Hmax), a warning lamp is lit (step S105), and a halt system mode is executed (step S106). The execution of the current routine is then temporarily halted. Namely, in this case, because the current hydrogen density inside the FC box 51 (i.e., the current hydrogen leakage amount from the fuel cell 11) already exceeds the maximum hydrogen density (i.e., the maximum hydrogen leakage amount) Hmax, an emergency stop is immediately executed for the fuel cell 11.

If, however, the result of the determination in step S104 is NO (i.e., if Hn≦Hmax), because it is not necessary to execute an immediate emergency stop for the fuel cell 11, the routine moves the step S107 where it is determined whether or not the predicted hydrogen density Hinf calculated in step S103 is higher than the maximum hydrogen density Hmax.

If the result of the determination in step S107 is NO (i.e., if Hinf≦Hmax), it can be predicted that even when the fuel cell 11 is operating at the maximum operating pressure Pmax the hydrogen density is not more than the maximum hydrogen density Hmax and, therefore, the routine moves to step S108. In step S108, it is determined whether or not the actual hydrogen density Hn read in step S102 is higher than a lower limit hydrogen density Hlow (for example, 0.5%), which is the threshold value of the hydrogen density safety range.

If the result of the determination in step S108 is NO (i.e., if Hn≦Hlow), the current hydrogen density inside the FC box 51 (i.e., the current hydrogen leakage amount from the fuel cell 11) is sufficiently low so as to be within the safety range. Therefore, the routine moves to step S109 where an output limit value (i.e., the permissible generated current Ilim) calculated in step S113 described below is initialized, and the processing of the current routine is temporarily ended.

If the result of the determination in step S108 is YES (i.e. if Hn>Hlow), the routine moves to step S110 in which a warning lamp is lit and the processing of the current routine is temporarily ended. The reason for this is to issue a warning and alert the driver because the current hydrogen density inside the FC box 51 (i.e., the current hydrogen leakage amount from the fuel cell 11) is below the maximum hydrogen density (i.e., the maximum hydrogen leakage amount) Hmax, but is in excess of the lower limit hydrogen density (i.e., the lower limit hydrogen leakage amount) Hlow.

If, however, the result of the determination in step S107 is YES (i.e., if Hinf>Hmax), then although the current hydrogen density inside the FC box 51 (i.e., the current hydrogen leakage amount from the fuel cell 11) is less than or equal to the maximum hydrogen density (i.e., the maximum hydrogen leakage amount) Hmax, because it is predicted that the hydrogen density inside the FC box 51 (i.e., the current hydrogen leakage amount from the fuel cell 11)

will exceed the maximum hydrogen density (i.e., the maximum hydrogen leakage amount) Hmax if the fuel cell 11 is operated at the maximum operating pressure Pmax, operating the fuel cell 11 at the maximum operating pressure Pmax should be avoided. Therefore, if the result of the determination in step S107 is YES, in step S111 the warning lamp is turned on. Thereafter, the routine moves to step S112 where the permissible operating pressure Plim corresponding to the permissible hydrogen density (i.e., the permissible hydrogen leakage amount) Hlim (for example, 1.9%) is calculated by map reference or by computer. Note that, in the present embodiment, for reasons of safety the permissible hydrogen density (i.e., the permissible hydrogen leakage amount) Hlim is set slightly less than the maximum hydrogen density (i.e., the maximum hydrogen leakage amount) Hmax, however, it is also possible for both to have the same numerical value.

Next, the permissible generated current Ilim corresponding to the permissible operating pressure Plim is calculated by map reference or by computer (step S113), and limited output operating mode is executed (step S114) using the permissible generated current Ilim as an output restricting value. The processing of the current routine is then temporarily ended. In the limited output operating mode control of the operation of the fuel cell is performed by limiting the current output from the fuel cell 11 to less than or equal to the permissible generated current Ilim.

Figure 7:
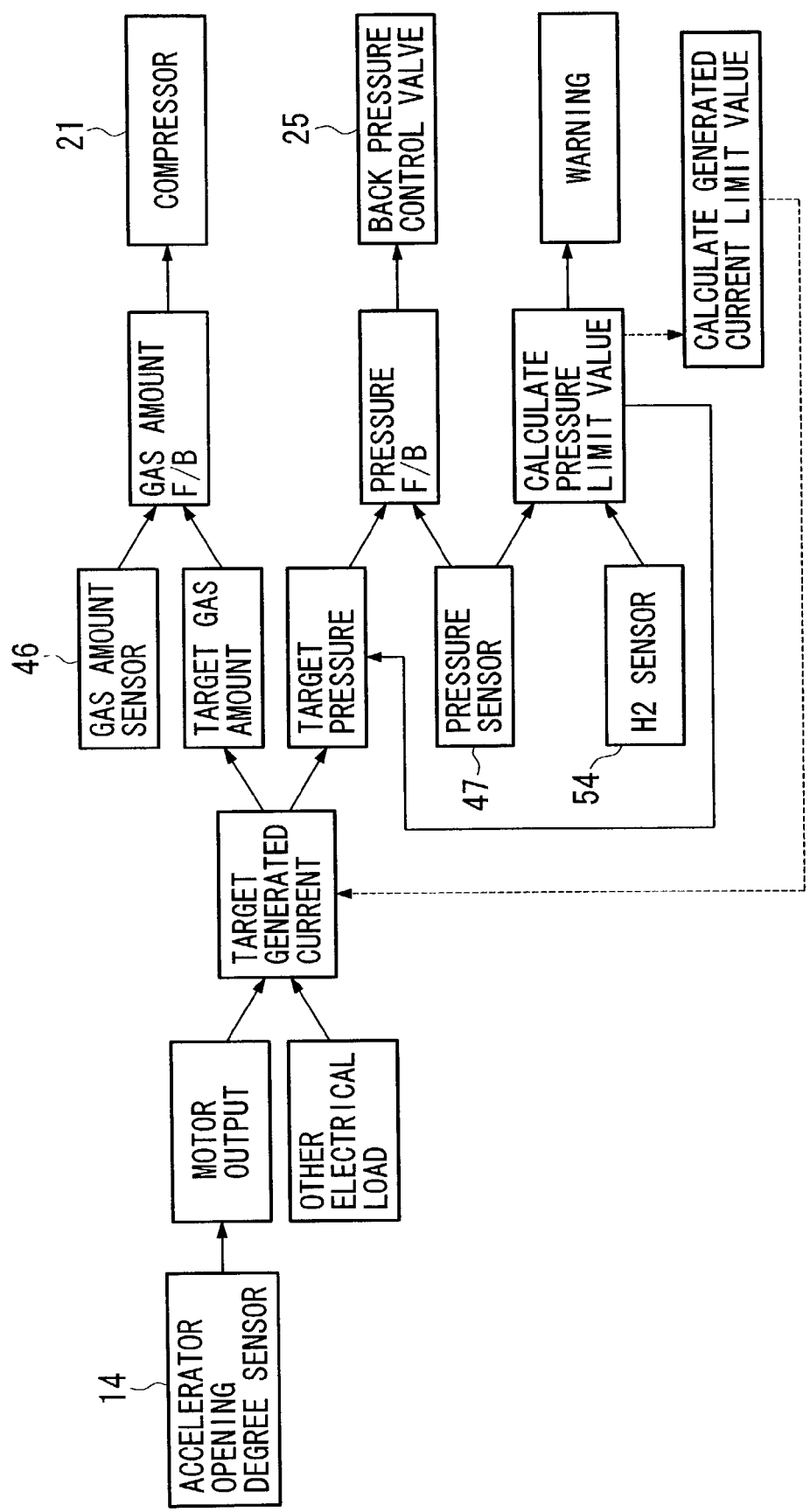
FIG. 7 is an example of an operation control block diagram for a fuel cell vehicle.

FIG. 7 is a block diagram showing an operation control method for the fuel cell 11 in the fuel cell vehicle 1.

In the fuel cell vehicle 1 the amount the accelerator pedal AP is depressed is detected as an accelerator opening degree by the accelerator sensor opening degree sensor 14. Based on this detected accelerator opening degree, the ECU 44 calculates the motor output required from the traction motor 13. In addition, the ECU 44 calculates the electrical load of various auxiliary equipment (for example, the air compressor 21 and the like) needed to operate the fuel cell 11.

Based on the motor output required from the traction motor 13 and the electrical load of the auxiliary equipment, the target generated current IFC to be extracted from the fuel cell 11 by the current controller 41 is calculated, and based on this target generated current IFC, a target gas amount (i.e., a target air supply amount) and a target pressure (i.e. a target air supply pressure) are calculated.

Next, based on this target gas amount, a rotation speed N for the air compressor 21 is calculated and the motor 43 of the air compressor 21 is controlled so as to rotate at the calculated rotation speed. In addition, feedback control of the rotation speed of the air compressor 21 is performed so that there is no difference between the actual gas amount (i.e., the actual air supply amount) detected by the gas amount sensor 46 and the target gas amount (i.e., the target air supply amount).

At the same time as this, a valve opening degree θ for the back pressure control valve 25 is calculated based on the target pressure, and the opening degree of the back pressure control valve 25 is controlled to become the opening degree θ. In addition, feedback control of the valve opening degree θ of the back pressure control valve 25 is performed such that there is no difference between the actual air supply pressure detected by the pressure sensor 47 and the target pressure (i.e., the target air supply pressure).

Moreover, based on the actual air supply pressure (namely, the actual operating pressure) detected by the pressure sensor 47 and the actual hydrogen density inside the FC box 51 detected by the hydrogen sensor 54, if necessary, an operating pressure limit value (i.e., a permissible operating pressure) is calculated, and the target pressure is limited to equal to or less than the operating pressure limit value and a warning is also issued. Alternatively, instead of limiting the operating pressure, a generated current limit value (i.e., the permissible generated current) corresponding to the operating pressure limit value is calculated and the target generated current is limited to equal to or less than the generated current limit value (i.e., the broken arrow line in FIG. 7). By employing a structure in which the target generated current is limited in this way, the current operating pressure can be estimated from the current generated current. Therefore, even if the pressure sensor 47 suffers a failure or the like, the limited operation of the fuel cell 11 is still possible. It is even possible to not provide the pressure sensor 47.

By performing the control of the operation of the fuel cell 11 in this way it is possible to alert the driver by turning on a warning lamp if the amount of hydrogen leaking from the fuel cell 11 increases to a particular amount. If the hydrogen leakage amount from the fuel cell 11 increases even further so that if the operating pressure increases beyond the current operating state, in which there is no problem, and the fuel cell 11 is then operated, there is a fear that the hydrogen leakage amount will exceed maximum hydrogen leakage amount. At this time, by operating the fuel cell 11 while limiting the output from the fuel cell 11, it is possible to reliably limit the hydrogen leakage amount such that it does not exceed the maximum hydrogen leakage amount. As a result, it becomes possible to operate the fuel cell vehicle 1 while predicting the condition of hydrogen leakage from the fuel cell 11, and to markedly reduce the probability that the fuel cell 11 will suddenly make an emergency stop from the present probability. In addition, it becomes possible to move the fuel cell vehicle 1 to a predetermined location such as a repair shop or the like while performing the operation to limit the output from the fuel cell 11.

Furthermore, if the hydrogen leakage amount from the fuel cell 11 exceeds the maximum hydrogen leakage amount even if the operation to limit the output from the fuel cell 11 is performed in this way, it is possible to perform an emergency stop of the fuel cell 11 so as to ensure safety.

Note that in the above described embodiment the pressure of air supplied to the fuel cell 11 is taken as the operating pressure to be controlled, however, the operating pressure to be controlled may also be the pressure of hydrogen gas supplied to the fuel cell 11.

As has been described above, according to the present invention, because the operating pressure is limited such that the hydrogen leakage amount from the fuel cell and from the hydrogen flow path does not exceed a predetermined value based on values detected by a hydrogen sensor, the excellent effect is achieved that the operation of the fuel cell can be maintained while suppressing the hydrogen leakage amount to less than the predetermined value.

Moreover, according to the present invention, in addition to the above effect, because an operating pressure at which the hydrogen leakage amount does not exceed the predetermined value is predicted based on characteristics of the fuel cell and the hydrogen leakage amount at the current operating pressure, the limiting of the operating pressure does not come only after it has been detected that the hydrogen leakage amount has exceeded the predetermined value, but because the limited operating pressure is predicted and limited after the fuel cell is already generating a small current and the fuel cell is operated while the operating pressure is in a low state, the excellent effect is achieved that it is possible to reliably limit the hydrogen leakage amount to less than a predetermined value.

What is claimed is:

1. A fuel cell operation method in which a fuel cell that generates power using a hydrogen gas and an oxidant gas supplied as reaction gases is operated at an operating pressure of the reaction gas that corresponds to a required power generation state, by controlling supply pressures of the reaction gases, wherein
   a hydrogen sensor that measures hydrogen density is provided in a vicinity of the fuel cell and a hydrogen flow passage, and
   based on values measured by the hydrogen sensor, the operating pressure of the hydrogen gas is decreased such that a hydrogen leakage amount from the fuel cell and hydrogen flow passage does not exceed a predetermined value, thereby continuing power generation by the fuel cell.

2. The fuel cell operation method according to claim 1, wherein based on characteristics of the fuel cell which specify a relationship between the operating pressure of the hydrogen gas and the hydrogen leakage amount, and the hydrogen leakage amount at a current operating pressure measured by the hydrogen sensor,
   an operating pressure of the hydrogen gas at which the hydrogen leakage amount will not exceed the predetermined value is predicted, and the operating pressure of the hydrogen gas is decreased to less than the predicted operating pressure.

3. The fuel cell operation method according to claim 1, further comprising the step of:
   when the hydrogen leakage amount exceeds the predetermined value, terminating operation of the fuel cell.

4. The fuel cell operation method according to claim 1, further comprising the steps of:
   controlling a supply pressure of the hydrogen gas using a supply pressure of the oxidant gas as a signal pressure; and
   controlling the supply pressure of the hydrogen gas such that the supply pressure of the hydrogen gas reaches the operating pressure of the hydrogen gas.

5. The fuel cell operation method according to claim 3, further comprising the steps of:
   supplying the oxidant gas compressed by a compressor; and
   controlling a supply pressure of the oxidant gas by controlling at least a rotational speed of the compressor.

6. The fuel cell operation method according to claim 3, further comprising the steps of:
   providing a pressure control valve on an oxidant flow passage provided on a discharge side of the fuel cell; and
   controlling a supply pressure of the oxidant gas with the pressure control valve.

7. The fuel cell operation method according to claim 1, further comprising the steps of:
   disposing at least one of the fuel cell and the hydrogen flow passage in a housing; and
   measuring a hydrogen density in a vicinity of an outlet of the housing with the hydrogen sensor.

8. A method for operating a fuel cell, wherein the fuel cell generates power using a hydrogen gas and an oxidant gas supplied as reaction gases, the method comprising the steps of:
   operating the fuel cell by supplying thereto the reactant gases at a first operating pressure for generating a required amount of power;
   detecting a hydrogen density in a vicinity of the fuel cell; and
   if the hydrogen density is above a predetermined value, decreasing the first operating pressure so as to reduce the hydrogen density below the predetermined value while continuing operation of the fuel cell.

* * * * *

(12) EX PARTE REEXAMINATION CERTIFICATE (6571st)
United States Patent
Sugino et al.

(10) Number: US 7,087,334 C1
(45) Certificate Issued: Dec. 16, 2008

(54) FUEL CELL OPERATION METHOD

(75) Inventors: Takuya Sugino, Hiki-gun (JP); Jun Suzuki, Saitama (JP); Nobutaka Nakajima, Utsunomiya (JP)

(73) Assignee: Honda Giken Kogyo Kabushiki Kaisha, Minato-Ku, Tokyo (JP)

Reexamination Request:
No. 90/008,358, Dec. 1, 2006

Reexamination Certificate for:
Patent No.: 7,087,334
Issued: Aug. 8, 2006
Appl. No.: 10/187,933
Filed: Jul. 2, 2002

(30) Foreign Application Priority Data

Jul. 4, 2001 (JP) .................... P2001-203939

(51) Int. Cl.
*H01M 8/04* (2006.01)

(52) U.S. Cl. ................ 429/25; 429/13; 429/22
(58) Field of Classification Search .......... None
See application file for complete search history.

(56) References Cited

U.S. PATENT DOCUMENTS 4,904,547 A * 2/1990 Mizumoto et al. ......... 429/22
5,441,821 A * 8/1995 Merritt et al. .............. 429/17
5,981,096 A * 11/1999 Hornburg et al. ........... 429/17

FOREIGN PATENT DOCUMENTS

EP 0827226 3/2000
JP 8-31436 A * 2/1996

OTHER PUBLICATIONS

English translation of Machida, JP 8–31436 A, Feb. 2, 1996.*
Office Action for German Application No. 102 29 644.8-45, dated Jul. 7, 2006.

* cited by examiner

*Primary Examiner*—Alan Diamond

(57) ABSTRACT

The present invention relates to a fuel cell operation method in which a fuel cell 11 that generates power using hydrogen gas and oxidant gas as reaction gas is operated at an operating pressure that corresponds to a required power generation state. A hydrogen sensor 54 that detects hydrogen density is provided in a vicinity of the fuel cell 11, and based on values detected by the hydrogen sensor 54 and on the amount of hydrogen leakage at the current operating pressure and on the characteristics of the fuel cell 11, an operating pressure is predicted at which the hydrogen leakage amount from the fuel cell will not exceed a predetermined value, and the fuel cell 11 is operated while limiting the operating pressure to below the predicted operating pressure.

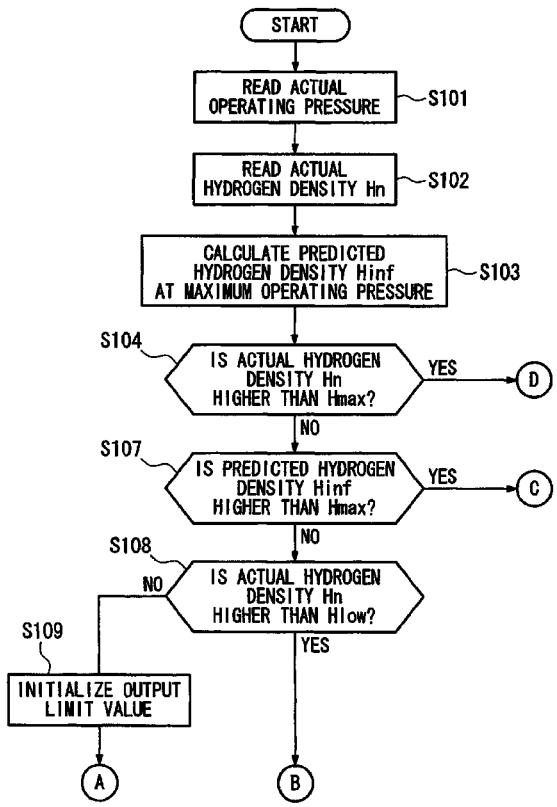

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2 and 8 are cancelled.

Claims 1, 3 and 4 are determined to be patentable as amended.

Claims 5–7, dependent on an amended claim, are determined to be patentable.

New claims 9–11 are added and determined to be patentable.

1. A fuel cell operation method in which a fuel cell that generates power using a hydrogen gas and an oxidant gas supplied as reaction gases is operated at an operating pressure of the reaction [gas] *gases* that corresponds to a required power generation state, by controlling supply pressures of the reaction gases, [wherein] *the method comprising:*
    measuring, with a hydrogen sensor [that measures hydrogen density is] provided in a vicinity of the fuel cell and a hydrogen flow passage [, and] *hydrogen densities outside of the fuel cell and outside of the hydrogen flow passage while passing a ventilation air in the vicinity of the fuel cell;*
    based on values measured by the hydrogen sensor, [the] *decreasing an* operating pressure of the hydrogen gas [is decreased] such that a hydrogen leakage amount from the fuel cell and *the* hydrogen flow passage does not exceed a [predetermined value] *permitted maximum hydrogen leakage amount,* thereby continuing power generation by the fuel cell, *wherein the decreasing comprises:*
    *determining a current hydrogen leakage amount from the measured hydrogen densities at a current operating pressure;*
    *adjusting data representing characteristics of the fuel cell which specify a relationship between the operating pressure of the hydrogen gas and the hydrogen leakage amount using the current hydrogen leakage amount occurring at the current operating pressure;*
    *predicting a permitted operating pressure of the hydrogen gas or a permitted generated current that produces the permitted maximum hydrogen leakage amount, based on the current hydrogen leakage amount and the adjusted data representing the characteristics of the fuel cell; and*
    *controlling a supply pressure of the hydrogen gas to decrease the operating pressure of the hydrogen gas to a value less than or equal to the permitted operating pressure or to maintain a generated current at a valve less than or equal to the permitted generated current.*

3. The fuel cell operation method according to claim 1, further comprising the step of:
    when the hydrogen leakage amount exceeds the [predetermined value] *permitted maximum hydrogen leakage amount,* terminating operation of the fuel cell.

4. The fuel cell operation method according to claim 1, further comprising the steps of:
    controlling [a] *the* supply pressure of the hydrogen gas using a supply pressure of the oxidant gas as a signal pressure; and
    controlling the supply pressure of the hydrogen gas such that the supply pressure of the hydrogen gas reaches the operating pressure of the hydrogen gas.

9. *A fuel cell operation method in which a fuel cell that generates power using a hydrogen gas and an oxidant gas supplied as reaction gases is operated at an operating pressure of the reaction gases that corresponds to a required power generation state, by controlling supply pressures of the reaction gases, the method comprising:*
    *housing said fuel cell and a hydrogen flow passage in a box which has a ventilation intake aperture and a ventilation outlet aperture so that a ventilation operation is performed with a ventilation air; and*
    *providing a hydrogen sensor in said box adjacent one of the apertures and in a vicinity of the fuel cell and the hydrogen flow passage, and the hydrogen sensor measuring hydrogen densities outside of the fuel cell, outside of the hydrogen flow passage, and inside of the box while performing the ventilation operation with the ventilation air in the vicinity of the fuel cell;*
    *based on the hydrogen densities in the box measured by the hydrogen sensor, decreasing an operating pressure of the hydrogen gas such that a hydrogen leakage amount from the fuel cell and the hydrogen flow passage does not exceed a permitted maximum hydrogen leakage amount, thereby continuing power generation by the fuel cell, wherein the decreasing comprises:*
    *determining a current hydrogen leakage amount from the measured hydrogen densities at a current operating pressure;*
    *adjusting data representing characteristics of the fuel cell which specify a relationship between operating pressure of the hydrogen gas and a hydrogen leakage amount using the current hydrogen leakage amount occurring at the current operating pressure;*
    *predicting a permitted operating pressure of the hydrogen gas or a permitted generated current that produces a permitted maximum hydrogen leakage amount, based on the current leakage amount and the adjusted data representing the characteristics of the fuel cell, and*
    *controlling a supply pressure of the hydrogen gas to maintain the operating pressure at a value less than or equal to the permitted operating pressure or to maintain a generated current at a value less than or equal to the permitted generated current.*

10. *The fuel cell operation method according to claim 1, wherein the data representing the characteristics of the fuel cell specifies a linear relationship between the operating pressure of the hydrogen gas and the hydrogen leakage amount.*

11. *The fuel cell operation method according to claim 10, wherein the adjusting comprises:*
    *maintaining a ratio of the linear relationship between the operating pressure of the hydrogen gas and the hydrogen leakage amount.*

* * * * *